United States Patent [19]

Tanaka et al.

[11] Patent Number: 4,804,622
[45] Date of Patent: Feb. 14, 1989

[54] TONER COMPOSITION FOR ELECTROPHOTOGRAPHY

[75] Inventors: Shingo Tanaka; Hideyo Nishikawa; Kuniyasu Kawabe, all of Wakayama, Japan

[73] Assignee: Kao Corporation, Tokyo, Japan

[21] Appl. No.: 16,387

[22] Filed: Feb. 19, 1987

[30] Foreign Application Priority Data

Feb. 21, 1986 [JP] Japan .................. 61-36939

[51] Int. Cl.⁴ .............................................. G03G 9/08
[52] U.S. Cl. ........................................ 430/109; 430/99
[58] Field of Search ......................... 430/109, 99, 114

[56] References Cited

U.S. PATENT DOCUMENTS

| | | | |
|---|---|---|---|
| 4,533,614 | 8/1985 | Fukumoto et al. | 430/109 |
| 4,575,478 | 3/1986 | Ohno | 430/109 |
| 4,634,649 | 1/1987 | Knapp et al. | 430/109 |

*Primary Examiner*—John L. Goodrow
*Attorney, Agent, or Firm*—Birch, Stewart, Kolasch & Birch

[57] ABSTRACT

A toner composition for electrophotography contains a binder resin, coloring material, and other additive as required, characterized in that the principal component of the binder resin is a polyester resin formed by co-condensation of (a) a diol component represented by the formula below;

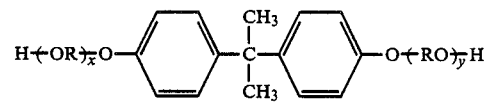

(where R denotes an ethylene group or propylene group; x and y each are integers greater than 1; and the average value of $x+y$ is 2 to 7.)

(b) a dibasic carboxylic acid, an acid anhydride thereof, or a lower alkyl ester thereof; and (c) tribasic or polybasic carboxylic acid, an acid anhydride thereof, or a lower alkyl ester thereof, or a trihydroxyl or polyhydroxylic alcohol; said polyester resin having an acid value (AV) and a hydroxy value (OHV) defined by OHV/AV=1.2 and up.

6 Claims, No Drawings

TONER COMPOSITION FOR ELECTROPHOTOGRAPHY

The present invention relates to a developer composition to develop thwe electrostatic latent image in electrophotography, electrostatic recording, and electrostatic printing.

Electrophotography comprises the steps of evenly charging a photoconductive insulating layer, exposing the layer, causing the electric charge on the exposed part to disappear, thereby forming an electrical latent image, making the latent image visible with an electrically charged toner (colored fine powder) [development step], transferring the visible image to paper or the like [transfer step], and fixing the toner by heating, pressing, or any other means [fixing step], as disclosed in, for example, U.S. Pat. Nos. 2,297,691 and 2,357,809.

The toner should meet different requirements in not only the development step but also the transfer and fixing steps.

The toner is subjected to mechanical shear, impact, and friction in the developer unit and becomes deteriorated after development of thousands of copies. The toner may be protected from deterioration if it is made of high-molecular weight tough resin which resists mechanical friction. Unfortunately, such a resin usually has a high softening point and is not effectively fixed by the non-contact type oven fixing or infrared radiant fixing which are poor in heat efficiency. In addition, it is not sufficiently fixed even by the contact type heat roller fixing, which is commonly used because of its high heat efficiency, unless the heat roller is kept at high temperatures. Keeping the heat roller at high temperature leads to the deterioration of rthe fixing unit, the curling of paper, and the increase of energy consumption. Moreover, the tough resin is not readily pulverized and is extremely poor in productivity of toner. For this reason, it is not practical to use a resin having an excessively high degree of polymerization and an excessively high softening point.

The heat roller fixing has a drawback although it is commonly used in all types of machines—low speed to high speed—because of its high heat efficiency. (The high heat efficiency is due to the fact that the surface of the heat roller comes in contact under pressure with the toner image on the transfer sheet.) The drawback is so-called offset, which is an undesired transfer of toner to the subsequent transfer sheet. This trouble occurs because part of the toner sticks to the heat roller when the heat roller comes into contact with the toner image. One way to prevent this trouble is to make the heat roller surface from a highly releasable material such as fluoroplastics and further to apply a release agent such as silicone oil to the heat roller surface. Unfortunately, the application of silicone oil needs a large fixing unit and complex operation, which leads to a cost increase and tends to cause troubles.

The trouble of offset may be avoided by using a binder resin having a broad molecular weight distribution as described in Japanese patent publication No. 6895/1980 and Japanese Patent Laid-open No. 98202/1981. In this case the resin has a high degree of molecular weight and it is usually necessary to establish a high fixing temperature.

Another means to avoid the trouble of offset is to use a cross-linked resin as disclosed in Japanese patent publication No. 44836/1975 and Japanese Patent Laid-open No. 37353/1982. This means, however, does not make improvement in the fixing temperature.

Usually the minimum fixing temperature is between a temperature at which the low temperature offset takes place and a temperature at which the high-temperature offset takes place. Therefore, the operating temperature ranges from the minimum fixing temperature to the temperature of high-temperature offset. If the minimum fixing temperature is lowered and the temperature for the high temperature offset is increased, it would be possible to lower the practical fixing temperature and broaden the operable temperature range. This also leads to energy saving, high-speed fixing, and the prevention of paper curling. The uncurled paper readily permits two-side copying, and the broad operable temperature range increases the allowance for temperature control of the fixing unit.

For reasons mentioned above, there is a need for a resin (or toner) which is superior in fixing performance and offset resistance.

To satisfy this need, there was proposed the use of an anti-offset agent such as paraffin wax and low-molecular weight polyolefin for the styrene resin binder, as disclosed in Japanese Patent Laid-open Nos. 65232/1974, 28840/1975, and 81342/1975. Unfortunately, an anti-offset agent is not effective when the amount is small and it rapidly deteriorates the developer when used in a large amount.

A polyester resin is inherently superior in fixing performance, and it is satisfactorily fixed by the non-contact fixing method as described in U.S. Pat. No. 3,590,000. The disadvantage of a polyester resin binder is that it easily causes offset and consequently it is not suitable for fixing by a heat roller. Attempts have been made to overcome this disadvantage by modifying a polyester resin with a polybasic carboxylic acid as disclosed in Japanese Patent Laid-open Nos. 44836/1975, 37353/1982, and 109875/1982. The resulting modified polyester resin, however, is not satisfactory in offset resistance or is improved in offset resistance only at a sacrifice of the low-temperature fixing performance which is the essential property of the polyester resin. Another disadvantage of a polyester resin-based toner is that it is inferior in fluidity to a polystyrene-based toner. The poor fluidity leads to the tendency of agglomeration which in turn hinders the smooth feeding of the toner in the developing unit and produces visible images of poor quality with uneven tone and scumming.

For the improvement of fluidity, the toner is incorporated with a large amount of hydrophobic silica fine powder or the like. However, this causes another problem in the case where a urethane rubber blade is used to clean the surface of the static image support. That is, the toner particles get between the blade and surface, with the result that the cleaning is incomplete and the visible image is stained. Moreover, in the case of a system in which the toner remaining untransferred on the paper is recycled to the developing unit, the hydrophobic silica fine particles eat into the surface of toner particles, reducing the fluidity of the toner and producing a visible image of poor quality.

The present invention was completed to solve the above-mentioned problems. Accordingly, it is an object of the present invention to provide a developer capable of being fixed, with no possibility of causing offset, at a lower temperature by a heat roller without the need of applying an offset preventing solution to the roller. It is another object of the invention to provide a developer which flows well without agglomeration and has a long life or does not degrade easily.

The gist of the present invention resides in a developer composition for electrophotography containing a binder resin, coloring material, and other additives as required, characterized in that the principal component of the binder resin is a polyester resin formed by co-condensation of (a) a diol component represented by the formula below;

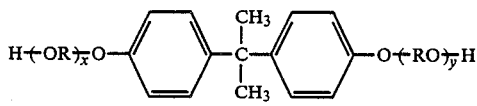

(where R denotes an ethylene group or propylene group; x and y each are integers greater than 1; and the average value of x+y is 2 to 7.)

(b) a dibasic carboxylic acid, an acid anhydride thereof, or a lower alkyl ester thereof; and (c) tribasic or polybasic carboxylic acid, an acid anhydride thereof, or a lower alkyl ester thereof, or a trihydric or polyhydric alcohol; said polyester resin having a ratio of OHV to AV in the range of 1.2 or more in which AV is an acid value and OHV is a hydroxyl value.

The invention provides a toner composition which comprises a coloring matter and as a binder resin polyester as defined above.

It is preferable in the invention that the binder resin has a softening point of 106° to 160° C. and a glass transition point of 50° to 80° C.

The polyester resin has residual carboxyl groups or hydroxyl groups at the terminals of molecules unless it undergoes the ester interchange reaction or the reaction with a monobasic carboxylic acid or an alcohol during the production. It is known that an amount of tribo electric charge on the polyester resin changes according to the amount of the terminal groups. If the amount of the terminal groups is excessively low, especially if the acid value is excessively low, the amount of tribo electric charge on the polyester resin is low. If too many terminal groups as such exist, that is, the acid value is too high, an amount of tribo electric charge on the polyester increases up to a certain level. But it is not suitable for a toner because a resulting toner is easy to be affected by the environmental conditions, in particular humidity. Polyester having an acid value of 5 to 60 (KOH) mg/g) are commonly used for toners. A polyester specifically having a ratio of OHV to AV of 1.2 or more can be used to form a toner which flows well and can be fixed at a lower temperature then in the state of arts.

The polyester resin used as a principal component of the binder resin in this invention is obtained by the condensation polymerization of alcohol and carboxylic acid, or carboxylate ester and caboxylic acid anhydride. Examples of the diol component (a) include polyoxypropylene-(2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, and polyoxypropylene(6)-2,2-bis(4-hydroxyphenyl)propane.

The alcohol component may contain up to 10 mol% of other diols such as ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol-A and hydrogenated bisphenol-A.

Examples of the carboxylic acid component (b) in this invention include maleic acid, furamric acid, citraconic acid, itaconic acid, glutaric acid, phthalic acid, isophthalic acid, terephthalic acid, cyclohexanedicarboxylic acid, succinic acid, adipic acid, sebacic acid, azelaic acid, malonic acid, an anhydride thereof, a lower alkyl ester thereof and other dibasic carboxylic acids.

The tri- or poly-functional monomer (c) in this invention is intended to reduce offset. With a small amount, it is not effective; and with a large amount, it makes reaction control difficult, with the result that the polyester resin fluctuates in performance and has a high minimum fixing temperature. Therefore, the tri- or poly-functional monomer (c) should be used in an amount of 5 to 60 mole%, preferably 5 to 30 mole%, in the carboxylic acid component or the alcohol component.

Among the tri- or poly-functional monomers (c), the alcohol component includes, for example, sorbitol, 1,2,3,6-hexanetetrol, 1,4-sorbitan, pentaerythritol, dipentaerythritol, tripentaerithritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene and other tri- and poly-hydroxylic alcohols. The tri- and polybasic carboxylic acids include for example 1,2,4-benzene-tricarboxylic acid, 2,5,7-naphthalene-tricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl)methane, 1,2,4,5-benzenetetra-carboxylic acid, 1,2,7,8-octanetetracarboxylic acid, Empol trimer acid, an anhydride thereof and a lower alkyl ester thereof.

According to the present invention, the binder resin contains the above-mentioned polyester resin as a principal component. It should preferably have a softening point of 106° to 160° C. and a glass transition point of 50° to 80° C. With a softening point lower than 106° C., the binder resin does not provide a broad temperature range in which offset does not take place. Conversely, with a softening point higher than 160° C., the binder resin has a higher minimum fixing temperature. The binder resin having a glass transition point lower than 50° C. is poor in storage stability after it has been made into a toner; and the one having a glass transistion point higher than 80° C. adversely affects the fixing performance of the toner.

An acid value and a hyroxyl value of the polyester resin can be measured according to the method provided in JIS K0070. The solvent used to measure the acid value should preferably be dioxane in the case where the polyester resin contains more than 3 wt% of ethyl acetate insolubles.

In the invention, the polyester to use for the binder resin for a toner has a specified ratio of OHV/AV of 1.2 or more. If the polyester resin has a value of OHV/AV lower than 1.2, it provides a toner having a higher minimum fixing temperature than that produced from a polyester resin having a value of OHV/AV higher than 1.2. In addition, such a toner is poor in fluidity and requires a large amount of hydrophobic silica fine powder for sufficient fluidity. In such a case, the resulting visible image is poor in quality as mentioned above.

The above-mentioned polyester resin defined by OHV/AV=1.2 and up can be readily produced by condensation polymerization in which the amount of the total alcohol components exceeds the amount of the total carboxylic acid components in terms of the number of functional groups.

The polyester resin used in this invention can be produced by condensation polymerization of the polybasic carboxylic acid and the polyol in an inert gas atmosphere at 180° to 250° C. The reactin may be accelerated by the use of common esterification catalysts such as zinc oxide, stannous oxide, dibutyltin oxide, and dibutyltin dilaurate. The condensation polymerization may be carried out under reduced pressure.

The polyester resin pertaining to this invention is used as a principal component of a toner. To make the polyester resin readily crushable in the process of toner preparation, it may be incorporated with a styrene resin or styrene-acrylic resin having a number-average molecular weight smaller than 11,000 or any other proper resin, in an amount up to 30 wt%. The polyester resin is made into a toner by adding a coloring material, magnetic powder and optionally a charge controlling agent. In addition it is also mixed with wax (to prevent offset) and hydrophobic silica (to improve fluidity). However, the polyester resin as the binder resin in this invention requires none or only a small amount of such additives.

The coloring material used in this invention includes, for exmple, carbon black, acetylene black, phthalocyanine blue, permanent brown FG, brilliant fast scarlet, pigment green B, rhodamine B base, solvent red 49, solvent red 146, and solvent blue 35, and mixtures thereof. Usually it is used in an amount of 1 to 15 parts by weight for 100 parts by weight of the binder resin.

The binder resin of the invention can be made into a magnetic toner by incorporating it with a magnetic substance which is a fine powder of magnetic metal such as iron, cobalt and nickel or a fine powder of alloy and compound such as ferrite, hematite, and magnetite which contains a ferromagnetic element. The magnetic substance is a fine powder having an average particle size of 0.1 to 1 μm. About 40 to 70 parts by weight of the magnetic substance is dispersed into 100 parts by weight of the binder resins.

[EXAMPLES]

The invention is described in more detail with reference to the following examples, which are not intended to restrict the scope of the invention. Quantities in the composition in the examples are expressed in terms of parts by weight.

Production Example 1

In a 2-liter four-neck glass flask equipped with a thermometer, stainless steel stirrer, reflux condenser and a nitrogen gas inlet were placed 840 g of polyoxypropylene(2.2)-2,2-bis(4-hydroxyphenyl)propane, 195 g of polyoxyethylene(2)-2,2-bis(4-hydroxyphenyl)propane, 249 g of terephthalic acid, 132 g of fumaric acid, 29 g of 1,2,4-benzenetricarboxylic acid, 2 g of dibutyltin oxide, and 1.5 g of hydroquinone. The flask was heated in a heating jacket and the reaction was carried out with agitation at 200° C. under a nitrogen stream. The degree of polymerization was checked time to time by measuring the softening point according to ASTM E28-51T. The reaction was stopped when the softening point reached 122° C. The resulting resin was a light yellowish solid having a glass transition point of 66° C. (measured by a differential thermal calorimeter). The resin had an acid value of 14 KOH mg/g and a hydroxyl value of 28 KOH mg/g. This resin is designated as the binder resin (1).

Production Example 2

Using the same apparatus and procedure as in Production Example 1, 1050 g of polyoxypropylene(2.2)-2,2-bis(4-hydroxyphenyl)propane, 339 g of azelaic acid and 141 g of 1,2,4-benzenetricarboxylic acid were reacted to give a polyester resin having a softening point of 122° C., a glass transition point of 60° C., an acid value of 19 KOH mg/g, and a hydroxyl value of 31 KOH mg/g. This polyester resin was designated as the binder resin (2).

Production Example 3

Using the same apparatus and procedure as in Production Example 1, 578 g of polyoxypropylene(2.2)-2,2-bis(4-hydroxyphenyl)propane, 176 g of polyoxyethylene(2)-2,2-bis(4-hydroxyphenyl)propane, 72 g of trimethylolpropane, and 473 g of isophthalic acid were reacted to give a polyester resin having a softening point of 122° C., a glass transition point of 63° C., an acid value of 23 KOH mg/g, and a hydroxyl value of 32 KOH mg/g. This polyester resin was designated as the binder resin (3).

Production Example 4

Using the same apparatus and procedure as in Production Example 1, 716 g of polyoxypropylene(2.2)-2,2-bis(4-hydroxyphenyl)propane, 12 g of 1,4-butanediol, 72 g of trimethylolpropane, 334 g of fumaric acid and 1.5 g of hydroquinone were reacted to give a polyester resin having a softening point of 122° C., a glass transition point of 60° C., an acid value of 25 KOH mg/g, and a hydroxyl value of 38 KOH mg/g. This polyester resin was designated as the binder resin (4).

Production Example 5

The same procedure as in Production Example 1 was repeated except that the amount of terephthalic acid was changed to 280 g. There was obtained a polyester resin having a softening point of 122° C., a glass transition point of 68° C., an acid value of 25 KOH mg/g, and a hydroxyl value of 23 KOH mg/g. This polyester resin was designated as the binder resin (5).

Production Example 6

The same procedure as in Production Example 3 was repeated except that the amount of isophthalic acid was changed to 500 g. There was obtained a polyester resin having a softening point of 122° C., a glass transition point of 65° C., an acid value of 26 KOH mg/g, and a hydroxyl value of 26 KOH mg/g. This polyester resin was designated as the binder resin (6).

Production Example 7

The same procedure as in Production Example 1 was repeated except that the reaction was stopped when the softening point of the resin reached 105° C. There was obtained a polyester resin having a glass transition point of 64° C., an acid value of 20 KOH mg/g, and a hydroxyl value of 35 KOH mg/g. This polyester resin was designated as the binder resin (7).

EXAMPLES 1 TO 4

Comparative Examples 1 and 2

Referential Examples 1 and 2.

The following materials were mixed according to the formulation specified using a ball mill, and the mixture was subjected to melt-mixing by a pressurized kneader. After cooling, the mixture was crushed and classified in the usual way. Thus there was obtained a toner having an average particle diameter of 11 μm.

<Formulation>

| Example 1 | |
|---|---|
| Binder resin (1) | 93 parts |
| Carbon black "Regal 400R" (made by Cabot Corp.) | 7 parts |

| Example 2 | |
|---|---|
| Binder resin (2) | 93 parts |
| Carbon black "Regal 400R" | 7 parts |

| Example 3 | |
|---|---|
| Binder resin (3) | 93 parts |
| Carbon black "Regal 400R" | 7 parts |

| Example 4 | |
|---|---|
| Binder resin (4) | 93 parts |
| Carbon black "Regal 400R" | 7 parts |

| Comparative Example 1 | |
|---|---|
| Binder resin (5) | 93 parts |
| Carbon black "Regal 400R" | 7 parts |

| Comparative Example 2 | |
|---|---|
| Binder resin (6) | 93 parts |
| Carbon black "Regal 400R" | 7 parts |

| Referential Example 1 | |
|---|---|
| Binder resin (7) | 93 parts |
| Carbon black "Regal 400R" | 7 parts |

| Referential Example 2 | |
|---|---|
| Binder resin (7) | 93 parts |
| Carbon black "Regal 400R" | 7 parts |
| Polypropylene wax | 4 parts |

"Viscol 550P", made by Sanyo Kasei Co., Ltd. The toners obtained in Examples 1 to 4 are designated as Toner 1 to Toner 4, respectively; the toners obtained in Comparative Examples 1 and 2 are designated as Comparative Toner 1 and Comparative Toner 2, respectively; and the toners obtained in Referential Examples 1 and 2 are designated as Referential Toner 1 and Referential Toner 2, respectively.

To prepare a developer, 39 g of each of the toners was mixed with 1261 g of resin-coated iron powder. The developing agent thus prepared was used in a commercial electronic copying machine (equipped with a photosensitive body of amorphous selenium, a fixing roller revolving at a speed of 255 mm/sec, and a heat roller at a varied temperature), with the oil applicator removed.

With the fixing temperature adjusted between 120° to 220° C., the toner was evaluated with respect to fixing performance and offset. The results are shown in Table 1.

The minimum fixing temperature denotes the temperature of the fixing roller at which the fixing ratio defined below is higher than 70%.

$$\text{Fixing ratio} = \frac{\text{Density of image after rubbing}}{\text{Density of image before rubbing}}$$

The fixed image is rubbed five times with a typewriter eraser having a bottom surface 15 mm×7.5 mm under a load of 500 g, and the optical reflection density of the image is measured with a Macbeth reflection densitometer.

The storage stability was evaluated in terms of the degree of agglomeration that occurs when the toner sample is allowed to stand for 24 hours at 50° C. and 40% RH. The results are shown in Table 1.

Comparative Toner 1, Comparative Toner 2, and Referential Toner 2 were poor in fluidity and transferability in the developing unit. For this reason, they caused uneven images and scumming at the beginning of copying. Reference Toner 1 was found to have a low minimum fixing temperature, but have a small area in which no offset took place. Toner 1 to Toner 4 had a low minimum fixing temperature and good transferability. They formed visible images of good quality until 50,000 copies were made.

Example 5

A binder resin (8) was produced in the same way as shown in Production Example 1, except that 200 grams of a copolymer of styrene and an acrylate, having a number-average molecular weight of 8,000 and a glass transition temperature of 62° C., having been obtained from 84 part by weight of styrene and 16 parts by weight of 2-ethylhexyl acrylate was further added to the reaction mixture. The obtained binder resin was found to have an acid value of 12 KOHmg/g and a hydroxyl value of 24 KOHmg/g.

The resin (8) was tested in respect to the pulverization property. It was first pulverized and classified in view of particle size with sieves to select powder having sizes between 16 mesh and 20 mesh according to the ASTM standard. Thirty grams, 30.00 g precisely measured, of the resin powder was then pulverized for 15 seconds with a coffer mill, HR-2170 available from PHLIPS, a tradename, and it was divided into two groups with a sieve having 32 mesh. When A is a weight by gram of the powder which does not pass through the sieve having 32 mesh, a remainder extent (percent by weight) is calculated by a formula: A/30.00×100. The operation was repeated three times. The remainder extent of the resin (8) on the average fell within a range between zero and 15 percent by weight, which should be marked as very excellent.

A toner composition 5 was prepared from the resin (8) and tested in the same way as shown in Example 1. Results are shown in Table 1.

TABLE 1

| Toner | Image density | Minimum fixing temperature | Temperature at which low-temperature offset does not occur | Temperature at which high-temperature offset occurs | Storage stability |
|---|---|---|---|---|---|
| Toner 1 | 1.34 | 135° C. | 135° C. | 220< | good |
| Toner 2 | 1.35 | 133 | 135 | 220< | good |
| Toner 3 | 1.33 | 135 | 135 | 220< | good |
| Toner 4 | 1.33 | 130 | 135 | 220< | good |
| Comparative Toner 1 | 1.16 | 155 | 150 | 210 | fair |
| Comparative Toner 2 | 1.15 | 158 | 145 | 210 | fair |
| Referential Toner 1 | 1.32 | 120 | 190 | 200 | good |
| Referential Toner 2 | 1.11 | 160 | 140 | 210 | fair |
| Toner 5 | 1.33 | 138 | 135 | 220< | good |

What is claimed is:

1. A toner composition which comprises a coloring material and a binder resin, said binder resin being a polyester having been obtained by co-condensation of
   (a) a diol component represented by the formula below:

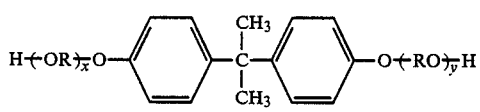

where R denotes an ethylene group or propylene group, x and y each are integers greater than 1, and the average value of $x+y$ is 2 to 7;
   (b) a dibasic carboxylic acid, an acid anhydride thereof, or a lower alkyl ester thereof; and
   (c) a tribasic or polybasic carboxylic acid, an acid anhydride thereof, a lower alkyl ester thereof or a trihydroxylic or polyhydroxylic alcohol, said polyester having a ratio of OHV to AV in the range of 1.2 or greater in which OHV is a hydroxyl value and AV is an acid value; and wherein said binder resin has a softening point of 106° C. to 160° C. and glass transition point of 50° C. to 80° C.

2. The toner composition according to claim 1 wherein said (c) component is used in an amount of 5 to 60 mol %.

3. The toner composition according to claim 1 wherein said (a) component is selected from the group consisting of polyoxypropylene-(2.2)-2, 2-bis(4hydroxyphenyl)propane, polyoxpropylene(3.3)-2, 2-bis(4-hydroxyphenyl) propane, polyoxyethylene (2.0)-2, 2-bis (4-hydroxyphenyl)-propane, polyoxpropylene (2.2)-polyoxyethylene (2.0)-2, 2-bis (4-hydroxyphenyl)propane, and polyoxpropylene (6)-2, 2-bis (4-hydroxyphenyl) propane.

4. The toner composition according to claim 1 wherein said (b) component is selected from the group consisting of maleic acid, fumaric acid, citraconic acid, itaconic acid, glutaric acid, phthalic acid, isophthalic acid, terephthalic acid, cyclohexanedicarboxylic acid, succinic acid, adipic acid, sebacic acid, azelaic acid, malonic acid, an anhydride thereof, and a lower alkyl ester thereof.

5. The toner composition according to claim 1 wherein said (c) component is selected from the group consisting of sorbitol, 1,2,3,6-hexanetetrol, 1,4-sorbitan, pentaerythritol, dipentaerythritol, tripentaerithritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene.

6. The toner composition according to claim 1 wherein said (c) component is selected from the group consisting of 1,2,4-benzene-tricarboxylic acid, 2,5,7-naphthalene-tricarboxylic acid, 1,2,4-naphthalenetricarboxyllic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra (methylenecarboxyl) methane, 1,2,4,5-benzenetetra-carboxylic acid, 1,2,7,8-octanetetracarboxylic acid, Empol trimer acid, an anhydride thereof and a lower alkyl ester thereof.

* * * * *